April 20, 1948. E. A. HELLER 2,440,047
CASTER
Filed Feb. 5, 1945
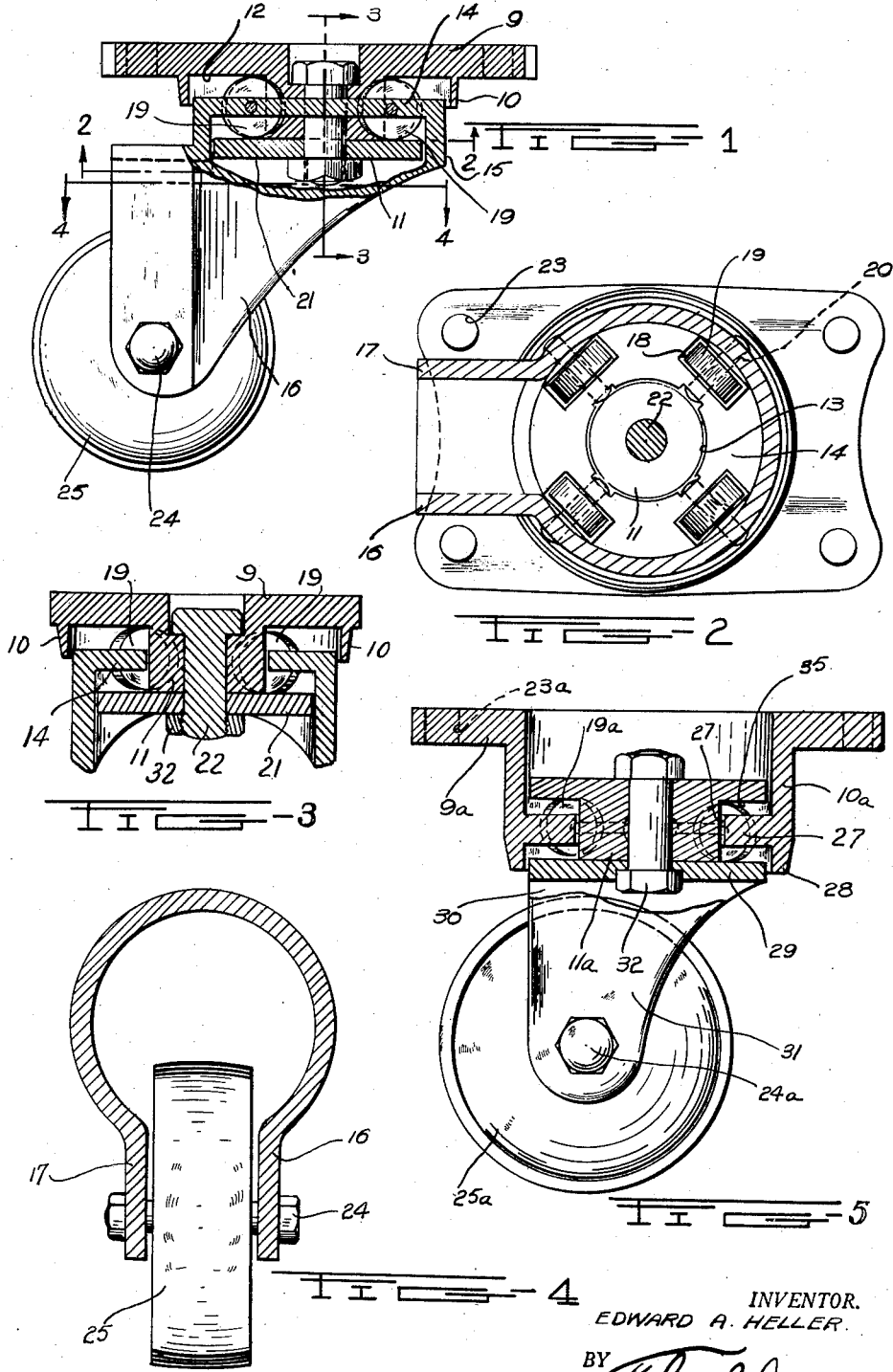
INVENTOR.
EDWARD A. HELLER.
BY 
HIS ATTORNEY.

Patented Apr. 20, 1948

2,440,047

UNITED STATES PATENT OFFICE 2,440,047

CASTER

Edward A. Heller, Detroit, Mich.

Application February 5, 1945, Serial No. 576,292

3 Claims. (Cl. 16—23)

My invention relates to a new and useful improvement in a caster embodying an attaching body to which is swively connected a supporting body carrying a rotatable traction member. I also utilize rollers mounted in such a manner as to faciiltate the easy rotation of the traction of the member which bears the traction member while resisting upward thrust and downward thrust.

It is an object of the present invention to provide a caster whereby the double thrust, that is, the downward thrust and the upward thrust is received on the caster and borne by a single row of bearings permanently positioned in one plane but operating on two planes.

Another object of the present invention is the provision of a caster which will be simple in structure, economical of manufacture, compact, possessing a minimum number of parts, easily and quickly assembled and highly efficient in use.

Another object of the invention is the provision of a caster having a forkhead on which are anchored rollers on one plane and so located that the thrust may be delivered to said rollers on two planes while, at the same time, the rollers are free to revolve under a load.

Another object of the invention is the provision of a caster having a forkhead and a top plate and an under thrust plate with rollers positioned between so relatively positioned that the rollers are free to revolve under load and the rollers will contact the under surface of the top plate in front and the upper surface of the under thrust plate in the back, thus having a dual operation in thrust resistance.

Other objects will appear hereinafter.

It is recognized that various changes and modifications may be made in the detail of structure illustrated without departing from the invention itself and it is intended that such variations and modifications shall be encompassed within the scope of the claims which form a part hereof.

Forming a part of this specification are drawings in which,

Fig. 1 is a side elevational view of the invention with a part broken away and a part shown in section;

Fig. 2 is a view of the invention taken on line 2—2 of Fig. 1;

Fig. 3 is a sectional view taken on line 3—3 of Fig. 1;

Fig. 4 is a sectional view taken on line 4—4 of Fig. 1;

Fig. 5 is a view similar to Fig. 1, showing a slight modification.

As shown in the drawings, the invention comprises a top plate 9 having a circular depending flange 10 on its lower face and provided with a central boss 11 projecting below the lower face 12. This boss 11 projects through a central opening 13 formed in the plate 14 on the yoke head, this plate 14 being circular in formation and provided at its periphery with the depending flange 15, projecting downwardly and forwardly from which are the yoke arms 16 and 17.

Formed in the plate 14 are elongated openings 18 in each of which is positioned a roller 19. In the form shown in Fig. 2, I have indicated four of these rollers positioned in diametrical opposite positions. Each of the rollers is rotatably mounted on a pin 20 which is secured in the plate 14 and extended diametrically thereof.

Positioned in the yoke head beneath the rollers 19 is a bottom thrust plate 21 through which is extended a bolt 22 which also passes through the boss 11 and through the plate 14 so that the plate 9, which serves as a supporting plate and which may be attached to a supporting body by fastening means projected through the openings 23, will serve to support the lower structure of the caster. Rotatably mounted between the forks 16 and 17 on the axle 24 is the traction member 25. The construction is such that the yoke head with the arms 16 and 17 may freely rotate around the axis of the bolt 22. When a load is placed upon the traction member, this load will be transmitted at the front of the caster head through the rollers to the under surface 12 of the plate 9 and at the rear side through the rollers 19 to the upper surface of the plate 21. Since the rollers are rotatably mounted on radially directed axes, the upward thrust on the rollers or the downward thrust on them, as the case may be, will not interfere with the free rotation of the fork head about the axis of the bolt 22 as a pivot.

A straight thrust delivered vertically to the caster head, as shown in Fig. 1, will, of course, be resisted by the rollers bearing against the upper surface of the plate 11. However, in actual use, the thrust will rarely be delivered vertically. There will, of course, be a vertically downwardly directed thrust but there will also be a thrust directed at substantially right angles thereto when the body on which the caster is mounted is being moved. This would have a tendency to tilt the caster head on the bolt 22. This tendency to tilt upwardly on the caster head plate 14 would be resisted through the rollers 19 bearing against the surface 12 of the plate 9 and also by some of the rollers bearing against the upper surface of the plate 11. It will be noted that the rollers are mounted in a single plane and that there is a single set or ring of rollers.

In Fig. 5, I have shown a slight modification in which the supporting plate 9a is provided with an extended annular flange 10a forming a tubular structure closed adjacent its lower end by the plate 27 beneath which is the annular flange 28. Rollers 19a are mounted in the plate 27 in the manner of mounting the rollers 19. The caster head embodies the plate 29 depending from which are the forks 30 and 31. A bolt 32 serves to connect the parts together and the plate 9a is provided with openings 23a through which attaching means may be directed. This structure, while operating in substantially the same manner as the structure illustrated in Fig. 1 and accomplishing substantially the same results, has been arranged to bring the load more directly over the axis 24a of the traction member 25a.

It will be noted that in both forms of structures illustrated, the axis of the traction member is offset from the bolt 22 or 32, as the case may be. This offset is to the left in the figures illustrated and the left side of the caster may be termed the front side and the right-hand side, the rear side. Consequently, when the load is transmitted downwardly onto the caster, the front side is pressed upwardly and the rear side is pressed downwardly in the form shown in Fig. 1. In the form shown in Fig. 1, the tendency of the fork head or the caster head to tilt would effect a tendency of the plate 14 to tilt upwardly at the left hand side and downwardly at the right hand side. The upward thrust is resisted by engagement of the rollers with the surface 12. The downward thrust is resisted by the thrust plate 21 engaging at its upper face with the rollers at the right hand side of the structure illustrated. There is a slight play between the plate 21 and the rollers and as the roller thrusts against the surface 12, there would be a slight withdrawal of the roller from the surface of the plate 21 at the left hand side of the structure. At the right hand side, the roller would have a tendency to move downwardly from the surface 12 and this thrust would be resisted by the upper face of the plate 21. Experience has shown that with this structure, while the load thrust is resisted in this manner, a free and easy swivelling of the caster head is always possible. The under surface of the boss 11 projects downwardly so that the plane of its lower face lies slightly beyond the periphery of the rollers. The plate 21 is securely fastened in fixed relation to the boss 11 and is in engagement at its upper face with the lower face of the boss 11 so that a fixed immovable structure is thus provided. The distance between the face 12 and the upper face of the plate 21 is greater than the diameter of the rollers 19 and the opening 13 through the plate 14, through which the boss 11 projects, is slightly larger than the diameter of the boss 11 to permit a slight tilting. In this thrust resistance, therefore, it will be noted that the under face of the boss 11 also serves to prevent tilting of the plate 21 cooperating with the bolt 22. By forming the space between the face 12 and the upper face of the plate 21 larger than the diameter of the rollers 19, a structure is provided in which it becomes impossible to lock or "freeze" the caster against swivel action about the axis of the bolt 22.

In the structure shown in Fig. 5, the bolt 32 is projected through the plate 35. Formed preferably integral with the plate 35 and projecting downwardly therefrom is a boss 11a which extends through an opening in the plate 27 and which engages the upper face of the plate 29. The bolt 32 serves to bind the plate 35 and the plate 29 in fixed relation to each other, so that a unitary fixed structure is provided. Consequently, when the thrust is delivered so that the plate 29 has a tendency at its left hand side to move upwardly, the upward thrust will be resisted by the rollers at the left hand side of the structure, these rollers engaging the upper face of the plate 29. The downward thrust at the right hand side of the structure shown in Fig. 5 will be resisted through the engagement of the under face of the plate 35 with the rollers. The distance between the under face of the plate 35 and the upper face of the plate 29 is slightly larger than the diameters of the rollers 19a. Consequenttly, the same action which is obtained by the structure shown in Fig. 1, namely, that the rollers never lock or "freeze" against rotation, is present in the structure shown in Fig. 5, with this slight modification illustrated.

It is believed obvious that ball bearings, or any other suitable type of anti-friction members, may be used in place of the rollers illustrated.

What I claim as new is:

1. In a caster of the class described comprising: a top plate adapted for attachment to a supporting body; a boss projecting centrally downwardly from said top plate and having an opening formed therethrough; an annular flange extending downwardly from said top plate concentrically to and surrounding said boss; a caster head embodying a plate having a plurality of recesses formed therein; a roller rotatably mounted on a radially directed axis in each of said recesses; a circumferential flange projecting downwardly from said last mentioned plate; a bearing plate mounted within said last named flange and extended parallel to said recess-bearing plate; a bolt projecting through said boss and through said plates for securing the same together, said caster head having a central opening for reception of and being rotatable on said boss and said rollers bearing against the upper face of said bearing plate.

2. A caster of the class described, comprising: a top plate adapted for attachment to a supporting structure; a boss projecting downwardly from the under surface of said top plate and having and opening formed therethrough; a depending circumferential flange projecting from the under surface of said top plate and surrounding said boss; a cup-shaped caster head positioned with the closed end thereof within the area defined by said flange and having a central opening for passage of said boss therethrough and rotatably mounted on said boss; a plurality of rollers carried by the base of said cup-shaped structure and projecting on opposite sides thereof, said rollers rotating on radially directed axes; a thrust resisting plate positioned in said cup-shaped structure beneath the bottom thereof; and a bolt projected through said boss and through said bottom and said thrust resisting plate for rotatably mounting the same on said top plate, said rollers being engageable with the upper face of said thrust resisting plate and the lower face of said top plate.

3. A caster of the class described, comprising: a top plate adapted for attachment to a supporting structure; a boss projecting downwardly from the under surface of said top plate and having an opening formed therethrough; a cup-shaped caster head mounted in inverted relation, there being central opening formed in the bottom thereof through which said boss is projected, said opening being slightly larger than the diameter of said boss; a plurality of rollers carried by the base of said cup-shaped structure, said rollers projecting on opposite sides of the base of said cup-shaped structure and rotating on radially directed axes; a thrust-resisting plate positioned in said cup-shaped structure below the bottom thereof and engageable with the lower face of said boss; a bolt projected through said boss and through said thrust-resisting plate for mounting said thrust-resisting plate in clamping relation to the lower face of said boss, the distance between the upper face of said thrust resistance plate and the lower face of said top plate being greater than the diameter of said rollers.

EDWARD A. HELLER.

REFERENCES CITED

The following references are of record in the file of this patent:

UNITED STATES PATENTS

| Number | Name | Date |
| --- | --- | --- |
| 384,886 | Asmus | June 19, 1888 |
| 1,033,256 | Ludwig | July 23, 1912 |
| 1,344,864 | Chesnutt | June 29, 1920 |
| 1,791,833 | Nice | Feb. 10, 1931 |
| 1,809,609 | Turner | June 9, 1931 |